United States Patent
Panikkar et al.

(10) Patent No.: US 8,098,783 B2
(45) Date of Patent: Jan. 17, 2012

(54) TRAINING PATTERN FOR A BIASED CLOCK RECOVERY TRACKING LOOP

(75) Inventors: Adarsh Panikkar, Tacoma, WA (US); Kersi H. Vakil, Olympia, WA (US); Pete D. Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 12/111,106

(22) Filed: Apr. 28, 2008

(65) Prior Publication Data

US 2008/0260082 A1   Oct. 23, 2008

Related U.S. Application Data

(63) Continuation of application No. 10/935,903, filed on Sep. 7, 2004, now Pat. No. 7,369,634.

(51) Int. Cl.
*H04L 7/00* (2006.01)

(52) U.S. Cl. ......... 375/354; 713/400; 713/500; 327/141

(58) Field of Classification Search .......... 375/229, 375/231, 354; 370/292, 508, 509, 512; 379/406.1; 327/141; 713/400, 500, 502, 503; 358/409, 358/424
See application file for complete search history.

(56) References Cited

U.S. PATENT DOCUMENTS

| | | | |
|---|---|---|---|
| 5,648,967 A | 7/1997 | Schulz | |
| 5,852,630 A * | 12/1998 | Langberg et al. | 375/219 |
| 5,907,566 A | 5/1999 | Benson et al. | |
| 7,369,634 B2 * | 5/2008 | Panikkar et al. | 375/354 |
| 2005/0027876 A1 | 2/2005 | Umei et al. | |

* cited by examiner

*Primary Examiner* — Khanh C Tran
*Assistant Examiner* — David Huang
(74) *Attorney, Agent, or Firm* — Marger Johnson & McCollom, P.C.

(57) ABSTRACT

Some embodiments of the invention provide a biased tracking loop that may include encoded information. Embodiments may comprise a training pattern, utilized in a non-interfering way that allows for clock recovery, embedded information transmission and/or header alignment. Therefore, embodiments may comprise a tracking loop training pattern that comprises data.

11 Claims, 6 Drawing Sheets

| Group # | Description | Value [11:0] |
|---|---|---|
| 0 | Header:<br>Continuous string of 9 ones identifies start of sequence | Bit[11:0] = 12'b 101111111110<br>             |           |<br>          MSB        LSB |
| 1 | Control:<br>Bit [4:0] – training pattern<br>Bit [11,9,7,5] – receiver id<br>• Host indicates which receiver should acknowledge reception<br>• Receiver returns this value | Bit [4:0] – 5'b 01010<br>Bit [5] – Receiver id value bit 0<br>Bit [6] – 1'b0<br>Bit [7] – Receiver id value bit 1<br>Bit [8] – 1'b0<br>Bit [9] – Receiver id value bit 2<br>Bit [10] – 1'b0<br>Bit [11] – Receiver id value bit 3 |
| 11-2 | 10 groups of clock training patterns | Bit[11:0]- 12'b101010101010 |

| Group # | Description | Value [11:0] |
|---|---|---|
| 0 | Header:<br>Continuous string of 9 ones identifies start of sequence | Bit[11:0] = 12'b 101111111110<br>               \|           \|<br>             MSB     LSB |
| 1 | Control:<br>Bit [4:0] – training pattern<br>Bit [11,9,7,5] – receiver id<br>• Host indicates which receiver should acknowledge reception<br>• Receiver returns this value | Bit [4:0] – 5'b 01010<br>Bit [5] – Receiver id value bit 0<br>Bit [6] – 1'b0<br>Bit [7] – Receiver id value bit 1<br>Bit [8] – 1'b0<br>Bit [9] – Receiver id value bit 2<br>Bit [10] – 1'b0<br>Bit [11] – Receiver id value bit 3 |
| 11-2 | 10 groups of clock training patterns | Bit[11:0]- 12'b101010101010 |

FIG. 3

TRAINING PATTERN FOR A BIASED CLOCK RECOVERY TRACKING LOOP

CROSS REFERENCE TO RELATED APPLICATIONS

This application is a Continuation of U.S. patent application Ser. No. 10/935,903, entitled, TRAINING PATTERN FOR A BIASED CLOCK RECOVERY TRACKING LOOP, filed 7 Sep. 2004, the disclosure of which is herein incorporated by reference in its entirety.

BACKGROUND

As electronic devices increase in complexity, data transfer and processing within these devices require greater coordination. One method to coordinate the data transfer and processing in these devices involves clocking. Numerous clocking schemes exist.

In derived clock systems, a remote receiving agent recovers and tracks clock phase information embedded in an incoming data stream. A tracking loop in the receiver may perform this function. Tracking loops should align to the data stream clocking prior to data reception (to account for clock phase skew between transmitter and receiver) and at regular intervals during transmission to correct for drift in a communication link. Drift and other clocking maladies can arise from fluctuations in voltage, temperature, manufacturing variations or other causes.

Conventional tracking loops examine multiple samples of an incoming data stream to determine which direction to shift a local clock to align with the center of an incoming data-eye. A system that extracts two samples per incoming data bit is shown in FIG. 1. Additionally, FIG. 1 illustrates two consecutive data bits at a receiver. Ideally, for proper capture of the incoming data stream, it is desirable to align consecutive sampling clock edges at the center and at the edge locations of a data eye. Thus, ri and rib should ideally be at the center of the data eye 1 or data eye 2 and rq and rqb at edge locations. A local clock is aligned by comparing edge samples with data samples on either side and inferring whether the edge occurred early or late and advancing or retarding the local clock to align to the remote sending clock.

FIG. 2 illustrates a voting process in a derived clock system. Referring to FIG. 2, votes are generated at data transitions, based on edge location. The dashed transition lines indicate two possible scenarios for edge alignment with respect to the sampler capturing the edge value. Generally, only these extreme scenarios are of significance since metastable values will resolve into a 1 or a 0 at the output of the receiver.

The receiver may align to the incoming data stream clock based on edge alignment. An edge falling along the large dashed line will sample a value coinciding with the latter of the two bits comprising a transition. An edge following the small dashed line samples a value coinciding with the former of the two bits. The local clock therefore may shift to the desired center, thus, a large dashed line edge will cause a retard vote and a small dashed line edge an advance vote.

Votes may be filtered for system stability. Once votes in a particular direction are above a filter threshold, the local clock is shifted in the desired direction. In an ideal system, once aligned to the center of the data eye, the number of advance and retard votes will statistically be equal, and therefore not exceed the filter threshold.

To simplify design of an analog front end, it is typical to employ a 1:2 or 1:4 de-multiplexed scheme between the receiver and its core. A high sampling rate can therefore be achieved without having any of the circuits run at full-speed. That is, serial to parallel conversion of data into data words is typically performed before any processing of the data.

Furthermore, voting schemes may provide additional accuracy. For example, in a biased voting scheme, specific clock phases are required to align to even or odd bit locations. In this case, referring to FIG. 2, ri will have to align strictly to data eye position #1 (odd position) and rib to data eye position #2 (even position).

Conventional tracking loops use high transition density patterns and various voting schemes to derive clocking information from incoming signals. However, communication is only performed with different patterns after tracking is accomplished.

BRIEF DESCRIPTION OF THE DRAWINGS

FIG. 3 illustrates an example training sequence containing encoded information.

DETAILED DESCRIPTION

This patent discloses specific details for purposes of illustrating inventive principles, however, numerous other arrangements may be devised in accordance with the inventive principles of this patent. Thus, the inventive principles are not limited to the specific details disclosed herein.

In general, a biased tracking loop may be encoded, such as with a training pattern, in a non-interfering way that allows for clock recovery, embedded information transmission and/or header alignment. Therefore, a tracking loop training pattern may also communicate data.

To satisfy biased voting pattern requirements, the training pattern should allow fast locking of a tracking loop by virtue of high transition density. This can be achieved by constructing a stream of bits that alternate between 1 and 0. Also, uniquely identifiable bits should be in even and odd positions. This is achieved by only allowing a fixed polarity value on even bit positions and the complementary polarity for odd bit positions in the training pattern. Furthermore, the training pattern should include encoded information, for example, agent identification, coherency bits for multiple bit links, word boundary identification bits, etc. Also, header information should be encoded in such a manner that it does not generate wrong votes. This may be accomplished by embedding information in uniquely identifiable bits, for example in even and odd positions.

Furthermore, the encoded bits are placed in the appropriate location of the pattern. Thus, if the bit is asserted, the transition that occurs from its preceding bit and to its following bit will cause votes in the right direction. If the bit is not asserted, lack of transitions will cause no vote. Thus, the encoded data will not interfere with the normal tracking process.

Figure 1:
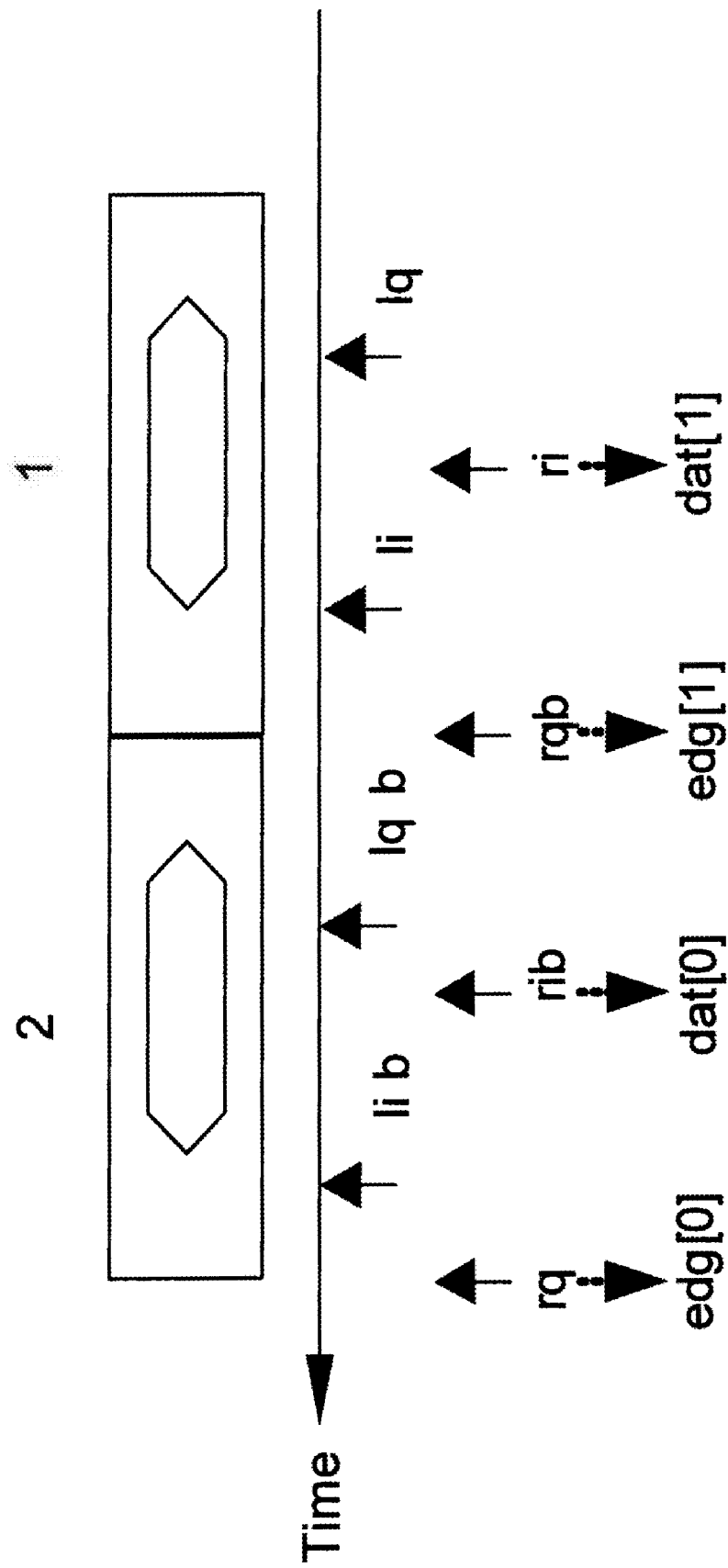
FIG. 1 illustrates a recovered clock alignment to an incoming data stream. li, lib, lq lqb are the initial receiver clock phases. These are phase shifted to align to the incoming data to produce ri, rib, rq, rqb.
Figure 2:
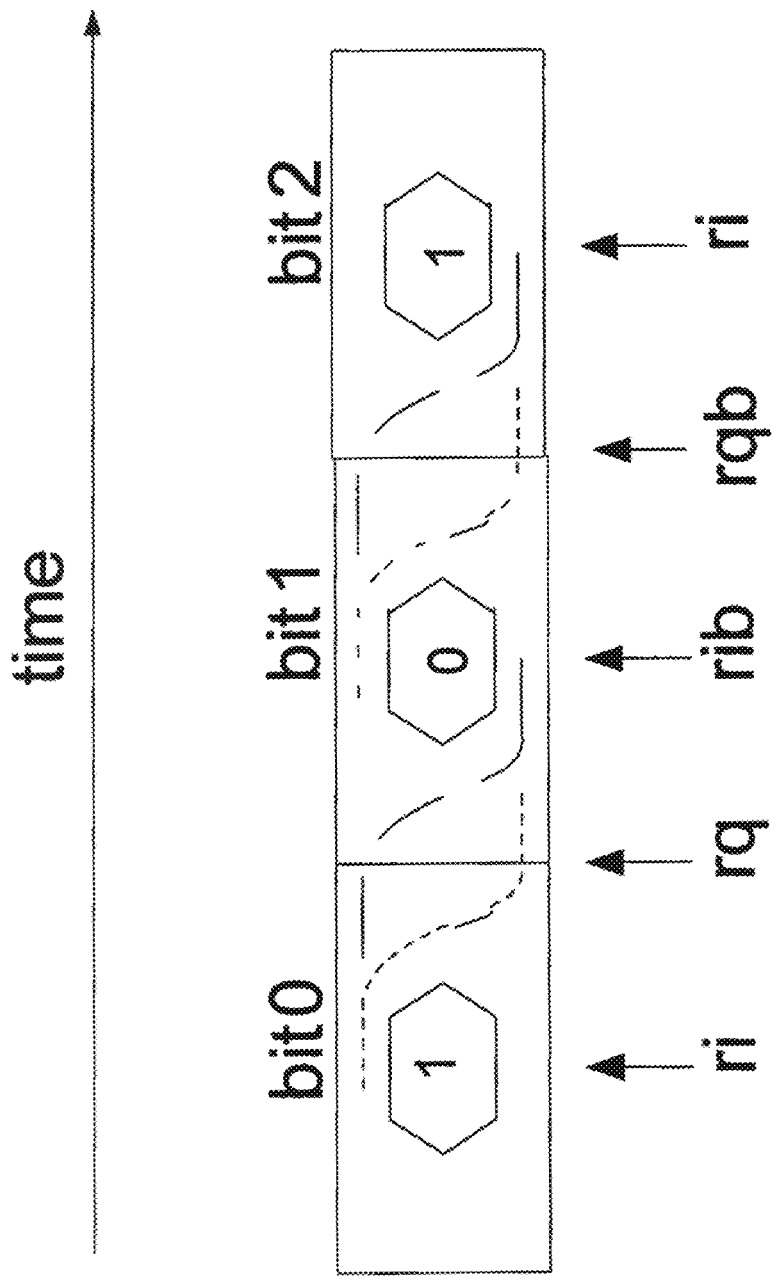
FIG. 2 illustrates sampling states of an incoming data stream that will generate either an advance vote or a retard vote in a biased voting scheme for a tracking loop in a derived clock system.

Referring to FIG. 2, by encoding a training sequence to have specific logic values in specific bit positions, a biased voting scheme can successfully align a sampling clock to a correct data eye. Thus, in addition to aligning on the center of any data eye, the tracking loop will try to align ri to 0 for instance and rib to a 1 considering an even or odd location can be coded either as a 0 or a 1. This will reduce by half, the number of comparators that are needed in achieving word alignment when transferring data into a lower frequency clock domain. Also, a biased voting scheme provides a latency benefit of one bit symbol time (UI), for example, in capturing an even bit first, rather than delaying until the even bit arrives next to complete word formation in the serial to parallel conversion process.

The considerations above regarding satisfying biased voting pattern requirements are utilized in the training sequence table in FIG. 3, where an example training sequence consists of 12 words, each comprised of 12 bits. The leftmost column in the table lists group number, the center column provides a description of the respective group numbers, and the column on the right provides the relevant bit values in each of the groups.

Referring to FIG. 3, group #0 contains header information to identify the start of a training sequence, as described in the description column. The header may comprise a continuous string of 9 ones. Any unique sequence may be used to signify the start of a training sequence, but preferably only if it is not otherwise used. For example, in FIG. 3 in the value column, group# 0 contains the 12 bits 1, 0, 1, 1, 1, 1, 1, 1, 1, 1, 1, 0, that is, the string of 9 ones mentioned above.

Referring to the embodiment in FIG. 3, group #1 contains control information. Bits 4 through 0 alternate between 0 and 1 values. The even bits 6, 8 and 10 are listed as asserted low. These bits may signify other information as well. The example shown in FIG. 3 involves receiver identification information placed on odd bit positions 11, 9, 7 and 5, but in general the example illustrates that information may be encoded in a control portion of a training pattern.

The pattern in FIG. 3 maintains transitions between adjacent bits in order to not hinder clock training patterns. Additionally, the control information in group #1 is encoded to not interfere with the biased voting scheme for derived clock recovery using a tracking loop. By identifying the even and odd bit positions right at the sampling stage, latency involved in delaying bits to form a whole word in a serial-to-parallel conversion is minimized. For example, the number of comparators needed in detecting word boundaries while performing serial-to-parallel conversion may be reduced by a half. Using a biased voting scheme will require only minor truth table modification of the existing tracking schemes.

Encoding information in a training sequence provides additional benefits. For example, link frequencies may be scaled without increasing circuit operation speed. De-multiplexing may be increased without incurring penalties like additional area, power and latency. By making minor modifications to a tracking loop voting algorithm, hardware in a IO data path can be reduced, resulting in more efficient implementation and easier validation. Furthermore, serial links that contain multiple lanes and point-to-point links will train more efficiently with an encoded pattern rather than a traditional training pattern since the information coded in the sequence can initiate different events on different lanes based on what stage a lane is at in the training process. Thus, for characteristic systems with varying delays in different stages of training for the same lane, the end result is a more balanced total training time.

The embodiment in FIG. 3 includes multiple groups containing clock training patterns. The clock training patterns are generally alternating bit patterns to maintain high transition density which aids clock recovery.

The embodiment in FIG. 3 may be implemented in a method for a biased clock recovery tracking loop comprising receiving header information in a training sequence, receiving control information in the training sequence, receiving a clock training pattern in the training sequence, and decoding data encoded in the control information. The method may further comprise decoding the training sequence and aligning a header for a biased tracking loop. Additionally, the header information may include a string of similar values to identify the start of a training sequence. The method above also may contain header information including nine consecutive similar values, for example, each value equal to one. The control information in the method above may be encoded on bits of a similar logic state, for example the control information may be encoded on bits with a high logic state.

Figure 4:
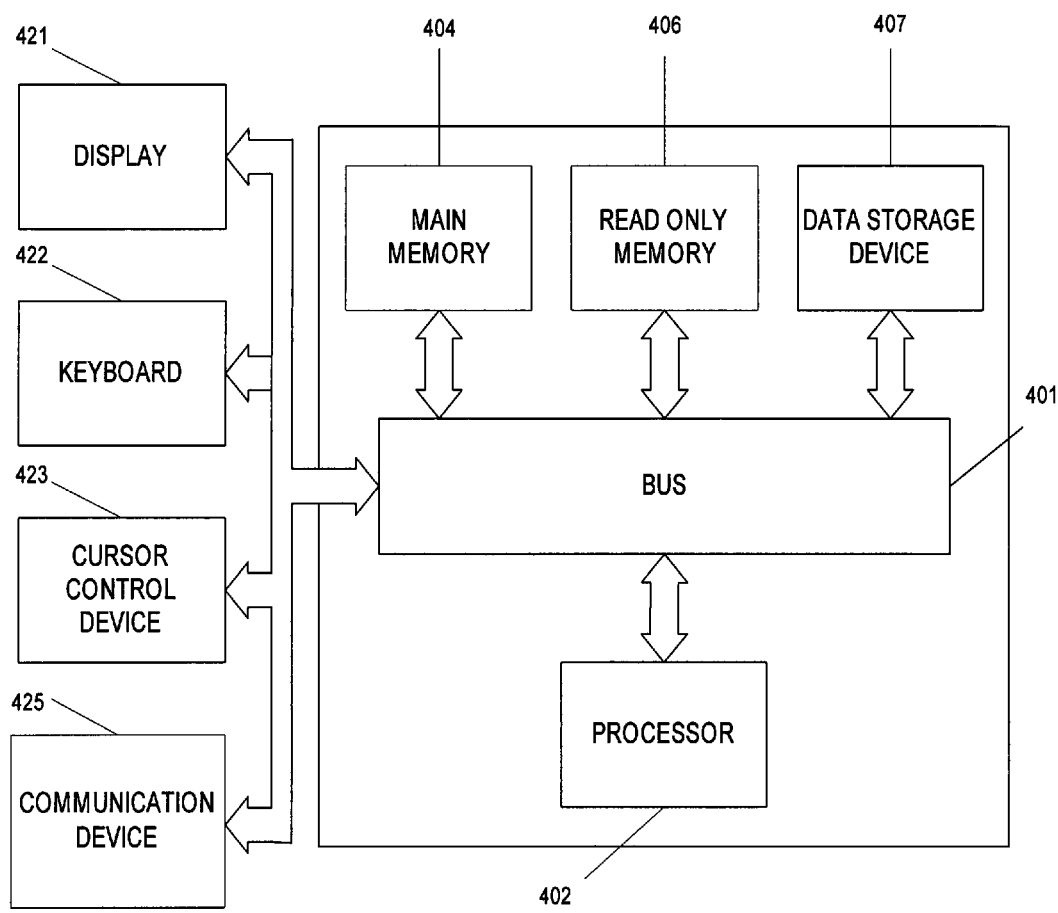
FIG. 4 illustrates an example computing system that may comprise instructions that cause a machine to perform aspects of the invention.

FIG. 4 is a block diagram of an exemplary control system as may be utilized in embodiments of the invention. Embodiments of the invention are not limited to a single computing environment. Moreover, the architecture and functionality of embodiments as taught herein and as would be understood by one skilled in the art is extensible to other types of computing environments and embodiments in keeping with the scope and spirit of the invention. The invention provides for various methods, computer-readable mediums containing computer-executable instructions, and apparatus. With this in mind, the embodiments discussed herein should not be taken as limiting the scope of the invention; rather, the invention contemplates all embodiments as may come within the scope of the appended claims.

Embodiments of the present invention include various operations, which will be described below. The operations, may be performed by hard-wired hardware, or may be embodied in machine-executable instructions that may be used to cause a general purpose or special purpose processor, or logic circuits programmed with the instructions to perform the operations. Alternatively, the operations may be performed by any combination of hard-wired hardware, and software driven hardware.

Embodiments of the present invention may be provided as a computer program product that may include a machine-readable medium, stored thereon instructions, which may be used to program a computer or other programmable devices to perform a series of operations according to embodiments of inventive principles. The machine-readable medium may include, but is not limited to, floppy diskettes, optical disks, CD-ROM's, DVD's, magno-optical disks, ROM's, RAM's, EPROM's, EEPROM's, hard drives, magnetic or optical cards, flash memory, or any other medium suitable for storing electronic instructions. Moreover, embodiments the present invention may also be downloaded as a computer software product, wherein the software may be transferred between programmable devices by data signals in a carrier wave or other propagation medium via a communication link such as a modem or a network connection.

FIG. 4 illustrates an exemplary control system 400 upon which embodiments of the invention may be implemented. For example, an apparatus comprising a machine-readable medium may contain instructions that, when executed, cause a machine to receive header information in a training sequence, receive control information in the training sequence, receive a clock training pattern for clock recovery in the training sequence, and decode data encoded in the control information. An embodiment may include an apparatus further comprising instructions that, when executed, cause a machine to decode the training sequence and align a header for a biased tracking loop.

In FIG. 4, control system 400 comprises a bus or other communication means 401 for communicating information, and a processing means such as processor 402 coupled with bus 401 for processing information. Control system 400 further comprises a random access memory (RAM) or other dynamically-generated storage device 404 referred to as main memory, coupled to bus 401 for storing information and instructions to be executed by processor 402. Main memory 404 also may be used for storing temporary variables or other intermediate information during execution of instructions by processor 402. Control system 400 also comprises a read only memory (ROM) and/or other static storage device 406 coupled to bus 401 for storing static information and instructions for processor 402.

A data storage device 407 such as a magnetic disk or optical disk and its corresponding drive may also be coupled to control system 400 for storing information and instructions. Control system 400 can also be coupled via bus 401 to a display device 421, such as a cathode ray tube (CRT) or Liquid Crystal Display (LCD), for displaying information to an end user. Typically, an alphanumeric input device such as a keyboard 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401. The communication device 425 may include a modem, a network interface card, or other well-known interface devices, such as those used for coupling to Ethernet, token ring, or other types of physical attachment for purposes of providing a communication link to support a local or wide area network, for example. In this manner, the control system 400 may be networked with a number of clients, servers, or other information devices.

It is appreciated that a lesser or more equipped computer system than the example described above may be desirable for certain implementations. Therefore, the configuration of control system 400 will vary from implementation to implementation depending upon numerous factors, such as price constraints, performance requirements, technological improvements, and/or other circumstances.

Although a programmed processor, such as processor 402 may perform the operations described herein, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

Figure 5:
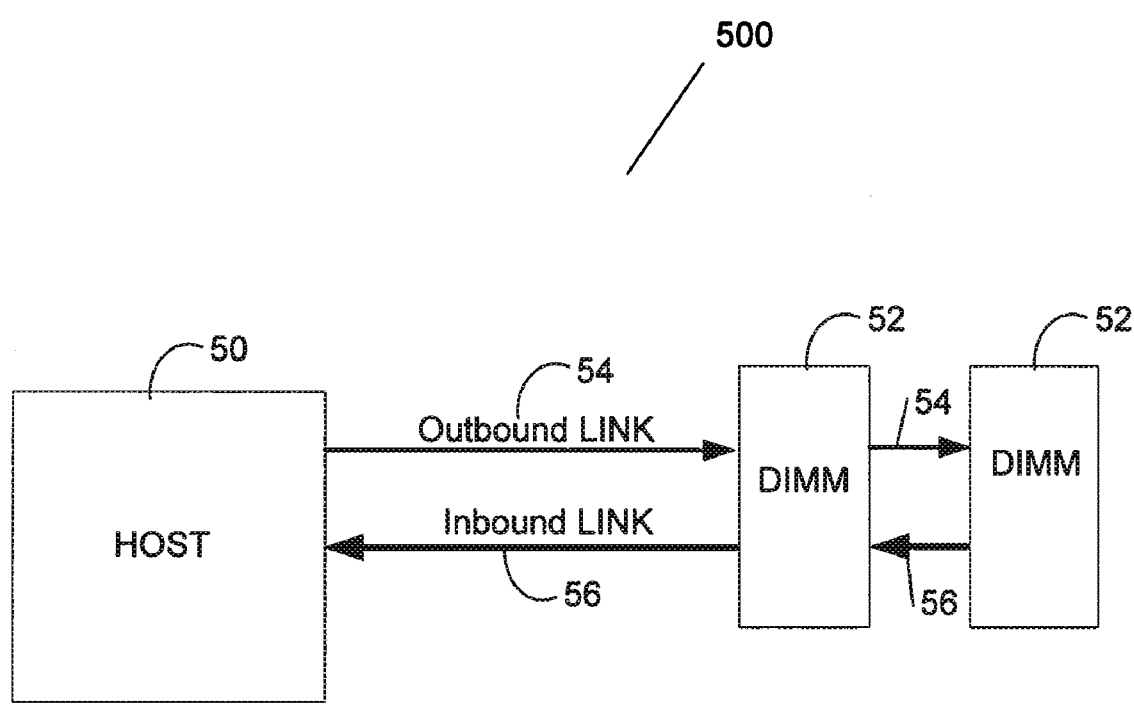
FIG. 5 illustrates a memory system that may utilize a training pattern with encoded information in a biased voting scheme for a tracking loop in a derived clock system.

FIG. 5 illustrates a memory system 500. The system comprises a host controller 50, at least one memory module such as DIMM 52, an outbound link 54 coupled with each DIMM, and inbound link 56 coupled with a DIMM, wherein the links are coupled with the host controller 50. The host 50 communicates with the DIMMs 52 over the links.

In the embodiment shown in FIG. 5, the host 50 may comprise a link to send a training sequence containing encoded information, and a circuit coupled with the link, the circuit to provide clocking information in a training sequence. The circuit in host 50 may also encode information in the training sequence. The host 50 may place header information in the training sequence to identify the training sequence start.

In the embodiment shown in FIG. 5, a DIMM may comprise a link to receive a training sequence containing encoded information, and a circuit coupled with the link, to recover clocking information from the training sequence with a biased clock recovery tracking loop. Furthermore, the DIMM may comprise a circuit to decode encoded information in the training sequence. Additionally, the training sequence may further comprise header information to identify the start of a training sequence.

Figure 6:
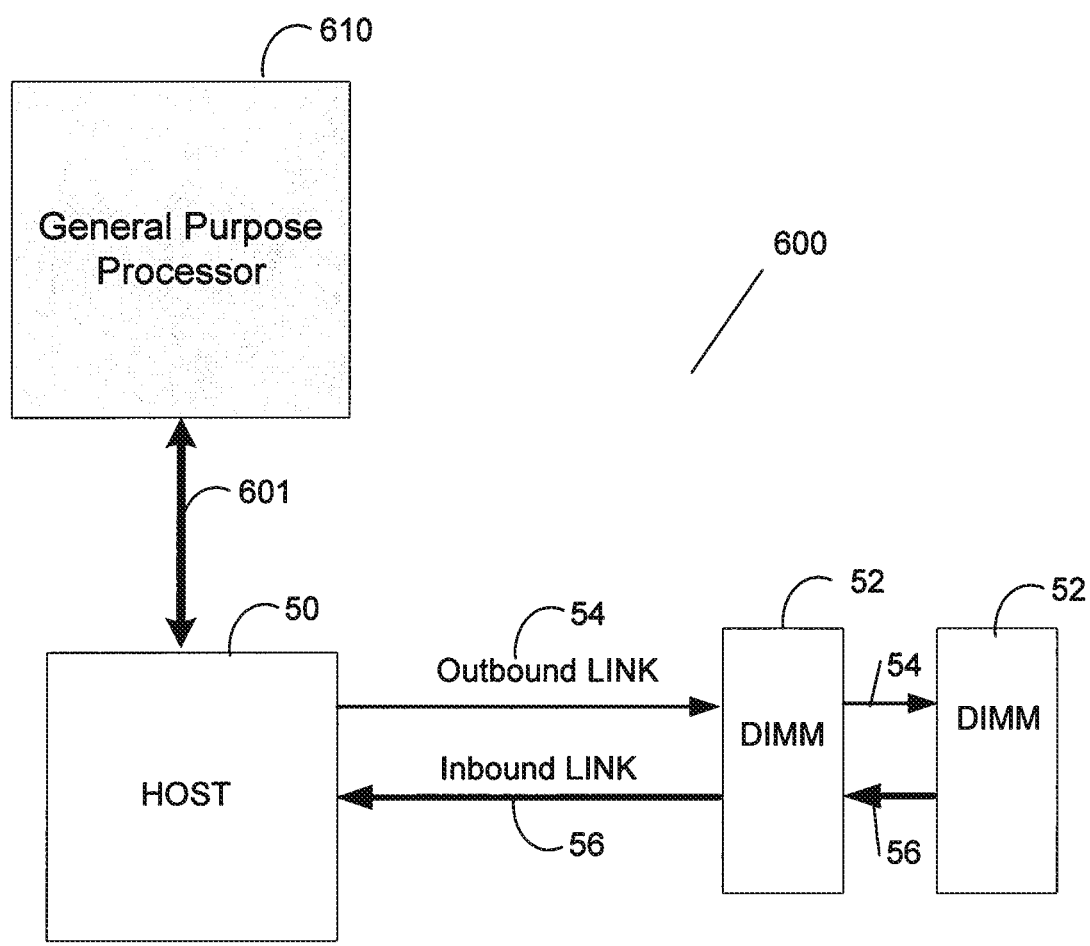
FIG. 6 illustrates a memory system including a general purpose processor that may utilize a training pattern with encoded information in a biased voting scheme for a tracking loop in a derived clock system.

FIG. 6 illustrates a system 600 similar to the system shown in FIG. 5, but further comprising a general purpose processor 610 coupled with the host. The general purpose processor 610 may provide some of the circuitry or processing that was in the host controller in FIG. 5, but otherwise the system can provide the same training sequence with encoded information. Likewise, any function performed by a portion of system 500 may be performed by the complementary portion of system 600.

The embodiments described herein may be modified in arrangement and detail without departing from the inventive principles. Accordingly, such changes and modifications are considered to fall within the scope of the following claims.

The invention claimed is:

1. A method for a biased clock recovery tracking loop comprising:
   receiving header information from a training sequence;
   receiving control information from the training sequence;
   receiving a clock training pattern from the training sequence; and
   decoding data encoded in the control information while deriving a clock from the training sequence, wherein the data is encoded in the control information such that a bit of the data in a first state causes a vote while deriving the clock from the training sequence.

2. The method of claim 1 further comprising, decoding the training sequence and aligning a header for a biased tracking loop.

3. The method of claim 1 wherein the header information includes a string of similar values to identify the start of a training sequence.

4. The method of claim 1 wherein the data is encoded in the control information such that a bit of the data in a second state causes no vote while deriving the clock from the training sequence.

5. An apparatus comprising:
   a link to receive a training sequence containing encoded data, wherein the data is encoded in the control information such that a bit of the data in a first state causes a vote while deriving the clock from the training sequence; and
   a circuit coupled with the link, the circuit to recover clocking information and the encoded data from the training sequence with a biased clock recovery tracking loop.

6. The apparatus of claim 5 wherein the data is encoded in the control information such that a bit of the data in a second state causes no vote while deriving the clock from the training sequence.

7. An apparatus comprising:
a link to receive a training sequence containing encoded data; and
a circuit coupled with the link, the circuit to recover clocking information and the encoded data from the training sequence with a biased clock recovery tracking loop, wherein:
the training sequence includes a header, control information, and a clock training pattern; and
the circuit is configured to decode the data from every other bit of a portion of the control information.

8. An apparatus comprising:
a link to send a training sequence containing encoded data; and
a circuit coupled with the link, the circuit to provide clocking information in the training sequence and to encode data in the training sequence, wherein:
the training sequence includes a header, control information, and a clock training pattern; and
the circuit is configured to encode the control information such that within the control information, a plurality of bits each having a first value are interleaved with bits of the data.

9. The apparatus of claim 8, wherein the training sequence further comprises header information to identify the start of a training sequence.

10. An apparatus comprising:
a link to send a training sequence containing encoded data and
a circuit coupled with the link, the circuit to provide clocking information in the training sequence and to encode data in the training sequence, wherein:
the training sequence includes a header, control information, and a clock training pattern;
the header includes a plurality of bits in a first state;
the control information includes a sequence of bits alternating between a bit in a fixed state and a corresponding bit of the data, the fixed state being only one of the first state and a second state for the entire sequence of bits; and
the clock training pattern includes a plurality of bits alternating between the first state and a second state.

11. The apparatus of claim 10, the sequence of bits of the control information referred to as a first sequence of bits, wherein the control information further includes a second sequence of bits alternating between the first state and the second state.

* * * * *